United States Patent [19]

Bauer et al.

[11] Patent Number: 4,877,115
[45] Date of Patent: Oct. 31, 1989

[54] PISTON FOR A PISTON-CYLINDER UNIT

[75] Inventors: Hans-Peter Bauer; Hans J. Bauer, both of Altdorf, Fed. Rep. of Germany

[73] Assignee: Fritz Bauer and Sohne OHG, Altdorf, Fed. Rep. of Germany

[21] Appl. No.: 219,750

[22] Filed: Jul. 15, 1988

[30] Foreign Application Priority Data

Jul. 29, 1987 [DE] Fed. Rep. of Germany ....... 3725101

[51] Int. Cl.$^4$ .............................. F16F 9/34; F16J 1/06
[52] U.S. Cl. .......................... 188/322.15; 188/322.18; 267/124
[58] Field of Search ...................... 267/120, 124, 64.11, 267/64.15, 128, 129; 188/322.15, 322.18, 322.11; 29/222, 223, 224, 269; 92/193, 194, 259, 205, 207; 91/422; 277/1

[56] References Cited

U.S. PATENT DOCUMENTS

| | | | |
|---|---|---|---|
| 1,054,345 | 2/1913 | Frank | 92/207 |
| 1,657,478 | 1/1928 | Kraus | 92/205 |
| 4,078,778 | 3/1978 | Hubweber | 267/124 X |
| 4,307,873 | 12/1981 | Möders | 267/64.15 |
| 4,356,898 | 11/1982 | Guzder et al. | 188/322.15 |

FOREIGN PATENT DOCUMENTS 7339491 2/1974 Fed. Rep. of Germany .
3513839 10/1986 Fed. Rep. of Germany .

Primary Examiner—Andres Kashnikow
Assistant Examiner—Matthew L. Graham
Attorney, Agent, or Firm—Browdy and Neimark

[57] ABSTRACT

A piston for a piston cylinder unit, particularly a gas spring, is to be provided with a piston ring and comprises a portion extending at least from the piston ring groove to a free end and consisting of a plurality of segments separated from one another by longitudinal slots. This portion is provided with a bore the diameter of which is at the free end smaller than the diameter of the related portion of the piston rod. It is the purpose of these measures to enable simple assembly of the piston ring in the piston ring groove and at the same time to ensure reliable seating of the piston ring.

9 Claims, 3 Drawing Sheets

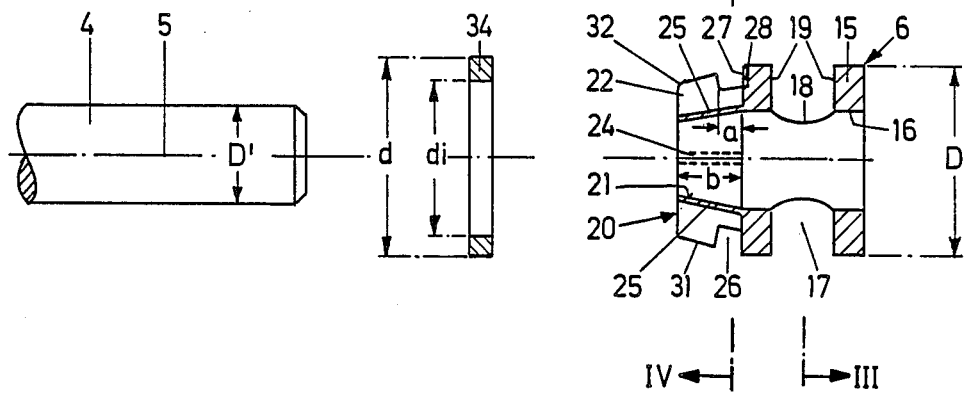
FIG. 2
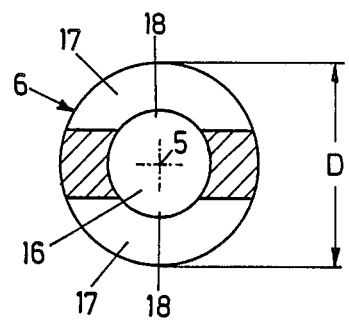
FIG. 4
FIG. 3
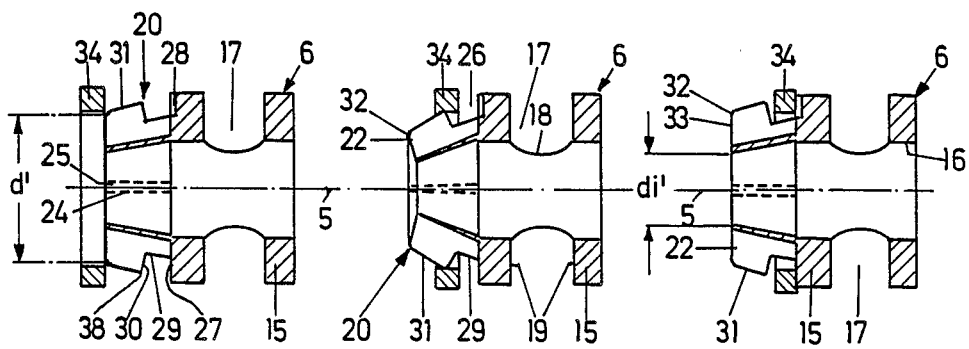
FIG. 5  FIG. 6  FIG. 7

PISTON FOR A PISTON-CYLINDER UNIT

FIELD OF THE INVENTION

The invention relates to a piston for a piston-cylinder unit, particularly a gas spring, comprising a substantially cylindrical housing having two ends and being filled with a fluid, particularly pressurised gas, and closed at one end and in which there is displaceably guided a piston rod which emerges in sealed manner from the other end of the said housing, the piston rod carrying the piston on a portion of an end which is located in the interior of the housing, the piston comprising a piston ring groove in which there is disposed a piston ring which comes to bear against side walls of the groove.

BACKGROUND OF THE INVENTION

Such a piston is known from published German patent application 35 13 839. In this case, the piston consists of a piston carrier adapted to be connected rigidly to the piston rod, and a piston ring disposed to be axially movable between two abutments on the piston carrier. The inside diameter of the piston ring is in this case slightly smaller than the outside diameter of an abutment. By reason of this development, the piston ring can be mounted on the piston carrier in that the piston ring is pushed over this abutment. The piston carrier which consists of rigidly resilient synthetic plastics material is so deformed in the process that the piston ring snaps into place in the piston ring groove. The abutment surface which the piston ring offers to this abutment is certainly very small so that it is impossible to preclude a risk of the piston ring not being reliably held in the piston ring groove between the abutments.

It is known from U.S. Pat. No. 4,307,873 to dispose a piston on a piston rod in such a way as to be axially displaceable, the piston having resilient projections which engage over a piston ring fixed on the piston rod by rivets, so that the piston is secured against falling out and off the piston rod.

SUMMARY OF THE INVENTION

It is an object of the invention to develop a piston of the type mentioned at the outset that on the one hand simple assembly of the piston ring on the piston is possible while, on the other hand, with simple assembly of the piston on the piston rod, a reliable seating of the piston ring is guaranteed.

According to the invention a portion of the piston which extends at least from the piston ring groove to a free end consists of a plurality of segments separated from one another by longitudinal slots and this portion is provided with a bore the diameter of which is at the free end smaller than the diameter of a portion of the piston rod which carries the segments. The central premise of the invention is that the piston is altogether constructed in only two parts, the piston ring being disposed in a piston ring groove as is already known. By virtue of the development of the piston according to the invention, it is assured that on the one hand the piston, possibly with a radial deflection of the segments towards the common axis, is pushed over the portion comprising the piston ring groove so that it snaps into place in the piston ring groove. Upon subsequent fitment of the piston on the piston rod, the segments are pivoted radially outwardly so that the side wall of the piston ring groove over which the piston ring has been pushed into the piston ring groove during fitment, is moved radially outwardly so that a corresponding radially adequate abutment is created, overlapping the piston ring. The slots disposed between the segments can be bridged by films. The outside wall of the portion over which the piston ring is pushed into the piston ring groove is substantially frustoconical. The same applies to the bore in this portion which is widened open cylindrically as the piston rod is pushed into it. Upon fitment of the piston, the slots are widened out so that they are substantially trapezoidal in form.

Further advantages and features of the invention will become apparent from the ensuing description of an example of embodiment taken in conjunction with the drawings.

BRIEF DESCRIPTION OF THE DRAWINGS

FIG. 2 shows a piston and a piston ring, in each case in section, and an associated portion of a piston rod in an exploded view;

FIG. 3 shows a cross-section through the piston taken on the line III—III in FIG. 2;

FIG. 4 shows a cross-section through the piston taken on the line IV—IV in FIG. 2;

FIG. 5 shows a longitudinal section through the piston at the commencement of fitment of a piston ring;

FIG. 6 shows a longitudinal section through the piston and the piston ring during fitment of the piston ring;

FIG. 7 shows a longitudinal section through the piston with the piston ring fitted.

DESCRIPTION OF PREFERRED EMBODIMENT

Figure 1:
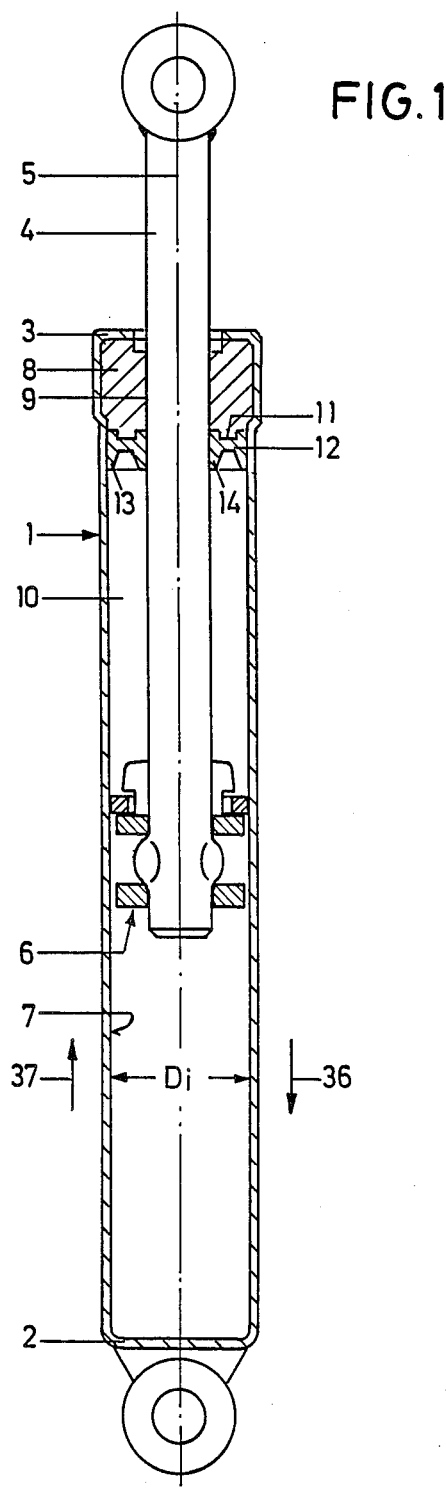
FIG. 1 shows a piston-cylinder unit constructed as a gas spring and comprising a piston according to the invention.
Figure 8:
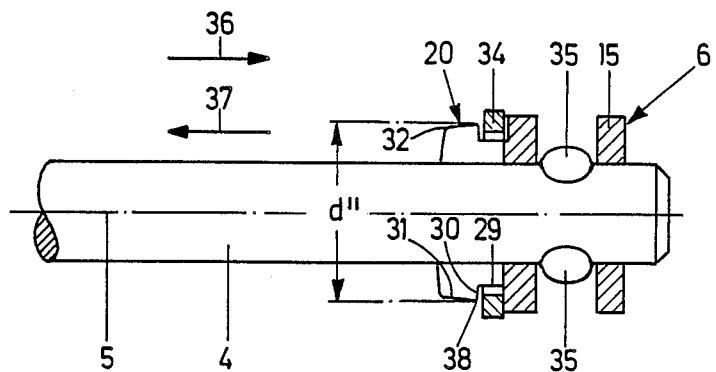
FIG. 8 shows a piston with a fitted piston ring in the situation in which it is mounted on a piston rod.

The piston-cylinder unit shown in FIG. 1 and constructed as a gas spring comprises a substantially cylindrical housing 1 produced from a tube and closed at one end 2. Emerging from the other end 3 of the housing 1 is a cylindrical piston rod 4 disposed coaxial with the central longitudinal axis 5 through the housing 1. At its end which is disposed in the housing 1, the piston rod 4 comprises a guide piston 6 which will be described in greater detail hereinafter. This guide piston 6 has at least a part of its outer periphery bearing against the inside wall 7 of the housing 1.

The piston rod 4 is guided at the end 3 of the housing 1 in a guide bush 8, of which the bore 9 which accommodates the piston rod 4 and which extends coaxially with the axis 5 is so adapted to the piston rod 4 that the latter is guided in the bore 9. The guide bush 8 is axially fixed in the housing 1.

At its end 11 which is towards the interior 10 of the housing 1, in other words the guide piston 6, the guide bush 8 has a moulded-on, stuck on or vulcanised-on sealing member 12 consisting of a flexible sealing material such as suitable grades of rubber or suitable synthetic plastics materials. Constructed on this sealing member 12 is a sealing tight external seal 13 which bears against the inside wall 7 of the housing 1 and an inner seal 14 which bears in sealing tight manner against the piston rod 4. By virtue of this type of seal, the interior 10 of the housing 1 which is filled for instance with compressed gas or perhaps with hydraulic fluid or with pressurised gas and a small quantity of fluid is sealed outwardly in an absolutely fluid tight manner.

As emerges from FIG. 2, the piston has a substantially cylindrical guide member 15, the outside diameter D of which is negligibly smaller than the inside diameter Di of the housing 1, so that the guide member 15 is indeed guided on and in respect of the inner wall 7 coaxially of the axis 5, although the passage of fluid such as pressurised gas or hydraulic fluid is possible between the guide member 15 and the inner wall 7. The guide member 15 comprises a bore 16 which is adapted in substantially clearance free manner to the piston rod 4.

The guide member 15 is provided with two recesses 17 which extend in the manner of secants. As FIGS. 2 and 3 show, these intersect with the bore 16, so that apertures 18 are formed. The recesses 17, in relation to the direction of the axis 5, are situated in the middle zone of the guide member 15 so that in the direction of the axis 5, on both sides of the recesses 17, there is material of the guide member 15 which forms side walls 19 of the recesses 17.

Adjacent the guide member 15 is a damping portion 20 constructed in one piece with the guide member 15. In the non-fitted state, this damping portion 20 comprises, likewise extending coaxially of the axis 5 and adjacent the cylindrical bore 16 and tapering out from it, a frustoconical bore 21 which therefore tapers towards the free end 22 of the damping portion 20 which is remote from the guide member 15.

The damping portion 20 is substantially constituted by a plurality of—in the present case four—annular segments 23 which are disposed at equal angular intervals—in the present case therefore at angular intervals of 90° circularly symmetrically of the axis 5. Between any two adjacent annular segments 23 there is a slot 24 which extends over the full axial length of the ring segments 23. In the region of the frustoconical bore 21, the slots 24 are bridged by thin films 25. In other words, this means that the slots 24 between adjacent annular segments 23 are sealed by the films 25 in respect of the frustoconical bore 21. These films 25 are as thin as is feasible within the framework of injection moulding techniques, i.e. their thickness amounts to only a few tenths of a millimetre. Of course, the films 25 do not have to be provided; therefore, the slots 24 can also isolate the annular segments 23 completely from one another.

In the transition zone from the guide member 15 into the damping portion 20, there is constructed in the latter an outwardly open piston ring groove 26. The groove wall 27 which is towards the guide member 15 is provided with radially extending damping passages 28. In the non-fitted state, the bottom 29 of the groove extends substantially parallel with the frustoconical bore 21. The opposite groove wall 30 which is towards the free end 22 of the damping portion 20 extends substantially at a right angle to it, as can be seen in FIGS. 2, 5 and 7.

The cutter wall 31 of the damping portion 20 which extends from the groove wall 30 as far as the free end 22 and which is therefore formed by the corresponding external faces of the ring segments 23, extends in the non-fitted state substantially parallel with the frustoconical bore 21, as can likewise be seen in FIGS. 2, 5 and 7. At the free end 22, the outer wall 31 passes through a rounded off portion 32 and merges into an annular end face 33.

It is important to fit into the piston ring groove 26 a piston ring 34 which consists of very rigidly resilient synthetic plastics material and of which the outside diameter d is substantially equal to the inside diameter Di of the housing 1 so that in the fitted state and when it is bearing against the inside wall 7, it provides a complete fluid tight seal in respect of the inside wall 7.

The inside diameter di of the piston ring 34 is—as can be seen in FIG. 5—substantially equal to the outside diameter d' of the damping portion 20 at its free end. When the piston ring 34 is pushed onto this damping portion 20, i.e. over its outer wall 31 in the direction of the guide member 15, the ring segments 23 are pressed towards one another. This is possible by virtue of the slots 24. The thin films 25 do not noticeably hamper this compression. In the intermediate fitting position of the piston ring 34 shown in FIG. 6, the damping portion 20 is sufficiently compressed that at the transition from the groove wall 29 to the outside wall 31 it has an outside diameter which is substantially equal to the inside diameter di of the piston ring 34. Subsequently, the piston ring 34 fits into the piston ring groove 26. The ring segments 23 now widen out again elastically into their original postion as shown in FIGS. 2 and 3.

Upon subsequent fitment of the piston rod 4, this latter is pushed into the free end 22 of the frustoconical bore 21, the ring segments 23 being pivoted outwardly, since the diameter D' of the piston rod 4 is in this area markedly greater, in fact by 25 to 40% greater than the inside diameter di' of the bore 21 in the region of the free end 22 of the damping portion 20 when the piston 6 is as yet not fitted onto the piston rod 4. After the piston rod 4 has been pushed through the damping portion 20, its bore 21 is cylindrical with a continuous diameter which corresponds to that of the piston rod 4. The slots 24 are now widened out trapezoidally towards the free end 22 of the damping portion 20. Upon this pushing in of the piston rod 4 and the widening out process which it entails, the films 25 are torn through. The groove wall 30 now extends radially, i.e. at a right angle to the axis 5. The groove bottom 29 now extends substantially concentrically of and parallel with the axis 5. Since the ring segments 23 are pivoted outwardly substantially by the region of the groove wall 27, the groove wall 30 is pivoted outwardly by an amount which corresponds to the ratio of the distance a between the groove walls 27, 30 to the axial length b of the damping portion 20.

After this pushing of the guide piston 6 onto the piston rod, this latter is squashed in the areas which traverse the two apertures 18, so that outwardly directed projections 35 are created which bear substantially against the side walls 19 of the recesses 17, so that the guide piston 6 is axially secure on the piston rod 4. The production of such projections 35 by a squashing process is known in the art. To this end, two rams directed towards each other are used to apply pressure substantially tangentially in the peripheral region of the piston rod, i.e. towards each other in the direction of the recesses 17.

The effect of the piston falls within the scope of the conventional. Upon retraction movements of the piston rod 4 with guide piston 6 into the housing, corresponding to the directional arrow 36, the piston ring 34 bears against the groove wall 30, i.e. the fluid present in the interior 10, for example pressurised gas, can flow through the free space between the piston ring 34 and the groove wall 27, the free space between the piston ring 34 and the groove bottom 29 and the slots 24 in the direction of the end 3 of the housing 1, in other words in opposition to the arrow 36. The pushing-in movement of the piston rod 4 with the piston 6 is therefore substantially undamped. Upon extension of the piston rod 4 with the guide piston 6 from the housing, according to the directional arrow 37, the piston ring 34 bears against the groove wall 27 so that the fluid can only pass through the damping passages 28 against the directional arrow 37, so that the extension movement of the piston rod 4 is heavily damped.

By the opening out of the ring segments 23 upon insertion of the piston rod 4, the outside diameter d'' of the damping portion 20 at the transition between the groove wall 30 and the outside wall 31 is sufficiently increased that it is markedly greater than the inside diameter di of the piston ring 34 so that this latter therefore bears rigidly against the groove wall 30 in the piston ring groove 26 during retraction movements as indicated by the directional arrow 36.

The dimensioning of the damping portion 20 can also be such that the pushing on of the piston ring 34 onto the damping portion 20 is possible via the edge 38 between groove wall 30 and outer wall 31 without the ring segments 23 being pressed together radially according to FIG. 6.

The guide piston 6 is preferably injection moulded from a suitable synthetic plastics material, for example a polyamide. It can however also be produced from a suitable die cast metal, if the ring segments are made sufficiently thin in the region of the groove bottom 27 so that a widening out is possible here.

What is claimed is:

1. A piston for a piston-cylinder unit, comprising a substantially cylindrical housing (1) having two ends (2, 3) and being filled with a pressurized fluid, and closed at one end (2) and in which there is displaceably guided a piston rod (4) which emerges in sealed manner from the other end (3) of the said housing (1), the piston rod (4) carrying the piston (6) on a portion of an end which is located in the interior (10) of the housing (1), the piston (6) comprising a piston ring groove (26) in which there is disposed a piston ring (34) which comes to bear against side walls (27, 30) of the groove (26), wherein a portion (20) of the piston (6) which extends at least from the piston ring groove (26) to a free end (22) consists of a plurality of segments (23) separated from one another by longitudinal slots (24) and wherein this portion (20) is provided with a bore (21) the diameter (di') of which is at the free end (22) smaller than the diameter (d') of a portion of the piston rod (4) which carries the segments (23).

2. A piston according to claim 1, wherein the segments (23) are connected to one another by films (25) bridging the slots (24).

3. A piston according to claim 1, wherein the outside diameter (d') of the portion (20) formed by the segments (23) in the region of its free end (22) is substantially equal to the inside diameter (di) of the piston ring (34).

4. A piston according to claim 1, wherein the outside diameter (d'') of the portion (20) formed by the segments (23) in a transition zone (edge 38) between the piston ring groove (26) and the outer wall (31) of the portion (20) is at least equal to the inside diameter (di) of the piston ring (34).

5. A piston according to claim 1, wherein the slots (24) extend over the width of the piston ring groove (26).

6. A piston according to claim 1, wherein the diameter (D') of that portion of the piston rod (4) which carries the segments (23) is 25 to 40% larger than the diameter (di) of the bore (21) at the free end (22) of the portion (20) formed by the segments (23).

7. A piston according to claim 1, wherein the bore (21) tapers frustoconically towards the free end (22) of the portion (20) formed by segments (23).

8. A piston according to claim 1, wherein in the region of the piston ring groove (26), the segments (23) are articulated on a guide member (15).

9. A piston according to claim 8, wherein the guide member (15) of the piston (6) is adapted for fitment on the piston rod (4).

* * * * *